US011586721B1

(12) United States Patent
Agrawal et al.

(10) Patent No.: US 11,586,721 B1
(45) Date of Patent: *Feb. 21, 2023

(54) SECURE REMOTE ACCESS OF COMPUTING RESOURCES

(71) Applicant: Amazon Technologies, Inc., Seattle, WA (US)

(72) Inventors: Himanshu Agrawal, Redmond, WA (US); Yang Lin, Seattle, WA (US); Chenghsien Jason Lu, Seattle, WA (US); Ameya Sadashiv Potadar, Seattle, WA (US); Prasad Renake, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,949

(22) Filed: Aug. 31, 2020

Related U.S. Application Data

(63) Continuation of application No. 15/587,015, filed on May 4, 2017, now Pat. No. 10,783,235.

(51) Int. Cl.
*G06F 21/45* (2013.01)
*G06F 21/44* (2013.01)
(Continued)

(52) U.S. Cl.
CPC .............. *G06F 21/45* (2013.01); *G06F 21/31* (2013.01); *G06F 21/44* (2013.01); *G06F 21/604* (2013.01); *H04L 63/0838* (2013.01)

(58) Field of Classification Search
CPC .......... G06F 21/44; G06F 21/31; G06F 21/45; G06F 21/604; H04L 63/0838
See application file for complete search history.

(56) References Cited

U.S. PATENT DOCUMENTS 5,742,683 A * 4/1998 Lee ........................ G07C 9/33
 705/60
6,055,637 A 4/2000 Hudson et al.
(Continued)

OTHER PUBLICATIONS

D. Gonzalez, J. M. Kaplan, E. Saltzman, Z. Winkelman and D. Woods, "Cloud-Trust—a Security Assessment Model for Infrastructure as a Service (IaaS) Clouds," in IEEE Transactions on Cloud Computing, vol. 5, No. 3, pp. 523-536, Jul. 1-Sep. 2017 (Year: 2017).*

(Continued)

*Primary Examiner* — Kari L Schmidt
(74) *Attorney, Agent, or Firm* — BakerHostetler

(57) ABSTRACT

Techniques for secure remote access of computing resources are described herein. In some examples, when a client requests to access a computing resource, a computing service may generate a first password value for the computing resource and transmit the first password value to the client. The client may then generate and transmit key data for entry of the first password value back to the computing service. The client may generate and transmit the key data on the user's behalf, without requiring any activation or selection of keys by the user. Upon receiving the key data, the computing service may enter the first password value into the computing resource, thereby allowing the client to access the computing resource. The computing service may detect the accessing of the computing resource and may change the first password value to a second password value.

17 Claims, 13 Drawing Sheets

(51) Int. Cl.
- G06F 21/60 (2013.01)
- G06F 21/31 (2013.01)
- H04L 9/40 (2022.01)

(56) References Cited

U.S. PATENT DOCUMENTS

| | | |
|---|---|---|
| 6,412,073 B1 | 6/2002 | Rangan et al. |
| 6,735,601 B1 | 5/2004 | Subrahmanyam |
| 6,918,044 B1* | 7/2005 | Robins .................. H04L 63/083 709/208 |
| 8,042,155 B1 | 10/2011 | Chang et al. |
| 8,255,984 B1 | 8/2012 | Ghostine et al. |
| 8,533,796 B1 | 9/2013 | Shenoy et al. |
| 8,661,361 B2 | 2/2014 | Morris |
| 8,862,762 B1 | 10/2014 | Motrenko et al. |
| 8,880,693 B2 | 11/2014 | Pasko et al. |
| 8,959,335 B2 | 2/2015 | Lu |
| 8,997,195 B1 | 3/2015 | Fadida et al. |
| 9,225,707 B1 | 12/2015 | de Sousa et al. |
| 9,325,688 B1 | 4/2016 | Hansen et al. |
| 9,367,362 B2 | 6/2016 | Kern |
| 9,407,615 B2 | 8/2016 | Shah et al. |
| 9,423,923 B1 | 8/2016 | Morris |
| 9,423,938 B1 | 8/2016 | Morris |
| 9,503,452 B1 | 11/2016 | Kumar et al. |
| 9,536,067 B1 | 1/2017 | Lee |
| 9,819,715 B2 | 11/2017 | Scurtu et al. |
| 9,841,878 B1 | 12/2017 | Morris |
| 10,009,443 B1 | 6/2018 | Guigli |
| 10,257,184 B1 | 4/2019 | Mehta et al. |
| 10,333,901 B1 | 6/2019 | Bauman et al. |
| 10,389,709 B2 | 8/2019 | Potlapally et al. |
| 10,440,012 B2 | 10/2019 | Hoyer et al. |
| 10,552,001 B1 | 2/2020 | Lin |
| 2003/0163737 A1 | 8/2003 | Roskind |
| 2004/0172535 A1 | 9/2004 | Jakobsson et al. |
| 2005/0235148 A1 | 10/2005 | Scheidt et al. |
| 2007/0180493 A1 | 8/2007 | Croft et al. |
| 2008/0028447 A1 | 1/2008 | O'Malley et al. |
| 2008/0192003 A1 | 8/2008 | Kondo et al. |
| 2009/0138819 A1 | 5/2009 | Yu |
| 2009/0178122 A1 | 7/2009 | McNeil et al. |
| 2009/0300608 A1 | 12/2009 | Ferris et al. |
| 2010/0077347 A1 | 3/2010 | Kirtane et al. |
| 2010/0146449 A1 | 6/2010 | Brown et al. |
| 2010/0162371 A1 | 6/2010 | Geil |
| 2010/0248787 A1 | 9/2010 | Smuga et al. |
| 2011/0131415 A1 | 6/2011 | Schneider |
| 2011/0138295 A1 | 6/2011 | Momchilov et al. |
| 2011/0261828 A1* | 10/2011 | Smith .................... H04L 49/70 370/401 |
| 2011/0296522 A1 | 12/2011 | Speyer et al. |
| 2012/0054648 A1 | 3/2012 | Morris |
| 2012/0216146 A1 | 8/2012 | Korkonen |
| 2012/0223890 A1 | 9/2012 | Borovsky et al. |
| 2012/0275596 A1 | 11/2012 | Ureche et al. |
| 2012/0297205 A1 | 11/2012 | Yuen et al. |
| 2012/0311322 A1 | 12/2012 | Koyun et al. |
| 2012/0331529 A1 | 12/2012 | Ibel et al. |
| 2013/0042271 A1 | 2/2013 | Yellin et al. |
| 2013/0086383 A1 | 4/2013 | Galvao de Andrade et al. |
| 2013/0122961 A1 | 5/2013 | Choi et al. |
| 2013/0151848 A1 | 6/2013 | Baumann et al. |
| 2013/0185812 A1 | 7/2013 | Lie et al. |
| 2013/0198797 A1 | 8/2013 | Raghuram et al. |
| 2013/0212385 A1 | 8/2013 | Schechter et al. |
| 2013/0218915 A1 | 8/2013 | Billau et al. |
| 2014/0006776 A1 | 1/2014 | Scott-Nash et al. |
| 2014/0007087 A1 | 1/2014 | Scott-Nash et al. |
| 2014/0026124 A1 | 1/2014 | Gilbert et al. |
| 2014/0047436 A1 | 2/2014 | Jayachandran et al. |
| 2014/0075522 A1 | 3/2014 | Paris et al. |
| 2014/0089658 A1 | 3/2014 | Raghuram et al. |
| 2014/0109191 A1 | 4/2014 | Raghuram |
| 2014/0137180 A1 | 5/2014 | Lukacs et al. |
| 2014/0189685 A1* | 7/2014 | Kripalani ............... G06F 3/0605 718/1 |
| 2014/0230024 A1 | 8/2014 | Uehara et al. |
| 2014/0237239 A1 | 8/2014 | Hursti |
| 2014/0280931 A1 | 9/2014 | Braun et al. |
| 2014/0281509 A1 | 9/2014 | Angelo et al. |
| 2014/0282889 A1 | 9/2014 | Ishaya et al. |
| 2014/0283042 A1* | 9/2014 | Littlejohn ............... G06F 21/62 726/22 |
| 2014/0298331 A1* | 10/2014 | Shimogawa ........ G06F 9/45533 718/1 |
| 2015/0106803 A1 | 4/2015 | Srivastava et al. |
| 2015/0113587 A1 | 4/2015 | Gautam |
| 2015/0127795 A1 | 5/2015 | Jagana et al. |
| 2015/0134953 A1 | 5/2015 | Seaborn et al. |
| 2015/0135257 A1 | 5/2015 | Shah et al. |
| 2015/0149951 A1 | 5/2015 | Magistrado et al. |
| 2015/0207800 A1 | 7/2015 | Jitkoff et al. |
| 2015/0244704 A1 | 8/2015 | Morrissey et al. |
| 2016/0269398 A1 | 9/2016 | Chhabra et al. |
| 2016/0380999 A1 | 12/2016 | Tevlin |
| 2017/0065887 A1 | 3/2017 | Colenbrander et al. |
| 2017/0098065 A1* | 4/2017 | Vaughn .................... G06F 21/36 |
| 2017/0111368 A1* | 4/2017 | Hibbert ................ H04L 63/062 |
| 2017/0118199 A1 | 4/2017 | Albisu |
| 2017/0331808 A1 | 11/2017 | Roth et al. |
| 2017/0364949 A1 | 12/2017 | Vandusen et al. |
| 2018/0159882 A1 | 6/2018 | Brill et al. |
| 2018/0183802 A1* | 6/2018 | Choyi .................... H04L 63/205 |
| 2018/0295421 A1 | 10/2018 | Lim et al. |
| 2019/0074972 A1* | 3/2019 | Shastri .................... G06F 21/36 |
| 2020/0007612 A1 | 1/2020 | Li et al. |

OTHER PUBLICATIONS

Tang, Jun, et al. "Ensuring security and privacy preservation for cloud data services." ACM Computing Surveys (CSUR) 49.1 (2016) : 1-39. (Year: 2016).*

Stobert, Elizabeth, and Robert Biddle. "A password manager that doesn't remember passwords." Proceedings of the 2014 New Security Paradigms Workshop. 2014, pp. 39-52. (Year: 2014).

Zhang, Yinqian, et al. "Cross-tenant side-channel attacks in PaaS clouds." Proceedings of the 2014 ACM SIGSAC Conference on Computer and Communications Security. 2014, pp. 990-1003. (Year: 2014).

E. Olden, "Architecting a Cloud-Scale Identity Fabric," in Computer, vol. 44, No. 3, pp. 52-59, Mar. 2011, doi: 10.1109/MC.2011.60. (Year: 2011).

K. Chard, S. Tuecke and I. Foster, "Efficient and Secure Transfer, Synchronization, and Sharing of Big Data," in IEEE Cloud Computing, vol. 1, No. 3, pp. 46-55, Sep. 2014, doi: 10.1109/MCC.2014.52. (Year: 2014).

Gordon, Wilson; Enable Thumbnails in Firefox's "List All Tabs" Menu; Lifehacker, Jun. 20, 2011. Retrieved from internet https://lifehacker.com/5813650/enable-thumbnails-in-firefoxs-list-all-tabs-menu; Year 2011; 3 pages.

Screen captures from YouTube clip entitled "How to Enable Tab Preview Feature on Firefox—2016"; published on Jul. 29, 2016, by Trick and Tips. Retrieved from Internet https://www.youtube.com/watch?v=JZafbkX7WxA; Year 2016; 3 pages.

Agarwal, Sandeep; "Activate Windows like Alt + Tab Thumbnail Preview Toggling for Firefox Tabs"; Guilding Tech, Nov. 14, 2012. Retrieved from Internet https://www.guildingtech.com/16986/firefox-tabs-thumbnall-preview-alt-tab-toggling; Year 2012; 4 pages.

U.S. Appl. No. 15/427,669; Non-Final Office Action; dated Nov. 29, 2018; 18 pages.

U.S. Appl. No. 15/427,669; Final Office Action; dated Apr. 11, 2019; 30 pages.

U.S. Appl. No. 15/427,669; Notice of Allowance; dated Oct. 2, 2019; 15 pages.

"HTMLIFrameElement"; published on Dec. 22, 2018 by MDN. Retrieved from Internet https://developer.mozilla.org/en-US/docs/Web/API/HTMLFrameElement; Year 2016; 7 pages.

(56) References Cited

OTHER PUBLICATIONS

U.S. Appl. No. 16/776,787; Non-Final Office Action; dated Sep. 16, 2020; 20 pages.
U.S. Appl. No. 16/776,787; Final Office Action; dated Mar. 8, 2021; 22 pages.
U.S. Appl. No. 16/776,787; Non-Final Office Action; dated Oct. 12, 2021; 25 pages.
U.S. Appl. No. 16/776,787; Final Office Action; dated Feb. 14, 2022; 24 pages.
U.S. Appl. No. 16/776,787; Non-Final Office Action; dated Oct. 7, 2022; 26 pages.

* cited by examiner

US 11,586,721 B1

SECURE REMOTE ACCESS OF COMPUTING RESOURCES

CROSS-REFERENCE TO RELATED APPLICATIONS

This application is a continuation of U.S. patent application Ser. No. 15/587,015, filed on May 4, 2017, the disclosure of which is hereby incorporated by reference as if set forth in its entirety.

BACKGROUND

The use of remote networked computing services to provide various computing resources has become increasingly popular in recent years. In some examples, a service may provide a computing resource on behalf of a customer, and the customer may connect to the computing resource in order to configure the computing resource. In some cases, the customer may connect to the computing resource in an administrative mode, for example to install and customize and applications, apply group policies and set restrictions, and perform other operations. Also, in some cases, the customer may connect to the computing resource in a test mode, for example to test applications, customizations, settings, restrictions, and other features. Users may often be required to provide a password or other security information to connect to the computing resource in the administrative mode, the test mode, or in other manners.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
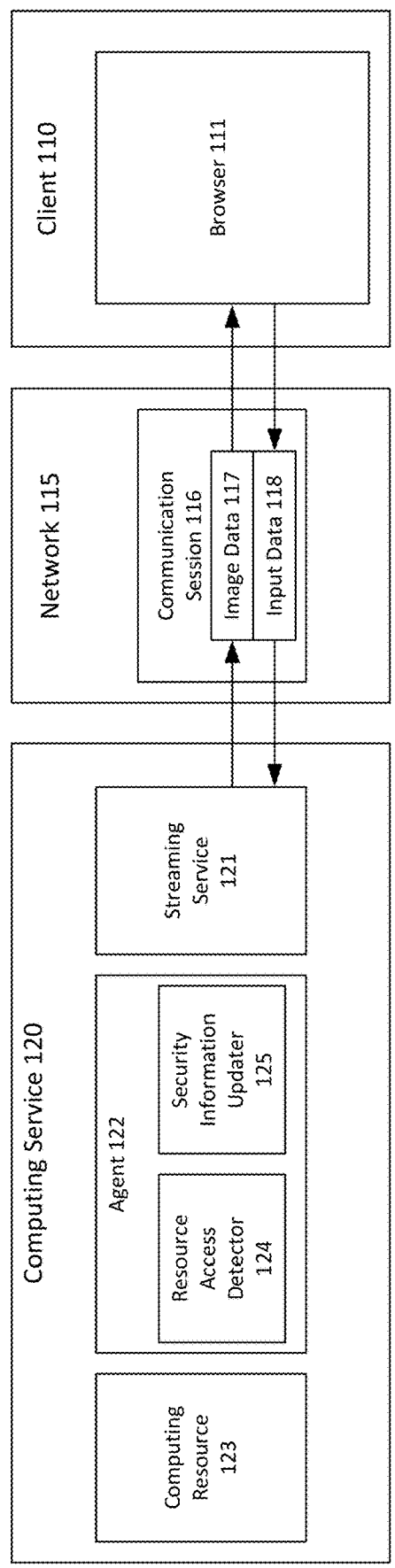
FIG. 1 is a diagram illustrating an example secure remote access system for a networked computing session that may be used in accordance with the present disclosure.

Techniques for secure remote access of computing resources are described herein. In some examples, a computing service may provide computing resources, such as virtual machine or other computing instances, on behalf of a customer or other user. A user may, for example, access the computing service and the computing resources remotely via one or more computing networks. For example, in some cases, the user may access the computing service and a computing resource via a web browser or other interface on a client device. In some cases, a computing resource may require entry of certain security information, such as a password or other identifier, in order to obtain access to the computing resource. The security information may assist in limiting access to the computing resources to authorized or other appropriate users.

In some cases, however, the requirement for a user to enter security information may have a number of associated drawbacks. For example, in some cases, to increase the strength and effectiveness of the security information, there may be certain requirements for the security information, such as certain lengths, character types (e.g., letter, number, punctuation, symbol, etc.), and other requirements. These requirements may often result in complex passwords or identifiers that are difficult for users to remember. This, in turn, may cause users to write down their security information, thereby increasing the likelihood that the security information may be lost or viewed by unauthorized individuals. Another complication associated with security information in remote networked contexts is that the security information may sometimes be susceptible to being compromised when it is being entered into a client interface, such as web browser, and/or transmitted over a network.

In some examples, to help alleviate these and other problems, techniques may be employed in which security information may be generated and entered on behalf of the user, without requiring the user to expend time and effort generating and memorizing the security information. This may eliminate the possibility that the user will forget the security information, which may sometimes result in denial of access to the resource or other inconveniences. This may also eliminate the possibility that users will write down the security information, thereby reducing the likelihood the security information may be lost or viewed by unauthorized individuals. Furthermore, in some examples, in addition to generating and entering security information on behalf of the user, the security information may also be repeatedly changed (e.g., scrambled) on behalf of the user. By repeatedly changing the security information, the risk of the security information being captured and used by unauthorized or malicious individuals is reduced. In particular, even in circumstances when the security information may be captured by an unauthorized individual, the likelihood is increased that the captured security information will be out-of-date and invalid by the time that the unauthorized individual attempts to use it.

In some examples, when a user at a remote client requests to access (e.g., log-on to) the computing resource, a first instance of the security information (e.g., a first password) may be generated by the computing service on the user's behalf. The first instance of the security information may then be transmitted, over one or more networks, by the computing service to the web browser or other client interface. The client interface may then transmit data for entry of the first instance of the security information back to the computing service. For example, the client interface may transmit key data, such as data associated with keyboard or keypad selections of the characters included in the first instance of the security information. Thus, in some examples, the user of the client does not enter the first instance of the security information into the client, such as by manually typing characters on a keyboard or keypad. Rather, the client interface may instead generate and transmit the key data on the user's behalf, without requiring any activation or selection of keys by the user. Thus, in some cases, the first instance of the password may never actually be revealed to, or known by, the user. In some examples, upon receiving the key data or other data for entry of the security information, the computing service may enter the security information into the computing resource on behalf of the user, thereby allowing the user to connect to and access the computing resource.

In some examples, the computing service may monitor the computing resource to detect when a user has successfully logged-on to or otherwise accessed the computing resource. Upon detecting that a user has accessed the computing resource, the computing service may change the security information for the user. For example, when the user successfully accesses the computing resource using the first instance of the security information, the computing service may detect this access and have the security information changed from the first instance of the security information to a second instance of the security information (e.g., a second password). As set forth above, this may reduce the risk that the first instance of the security information may be captured and used by an unauthorized individual to gain access to the computing resource.

In some cases, the above described techniques may be particularly advantageous for use in building of a model computing resource, such as a virtual machine image, that may be copied or otherwise deployed to other computing resources that are purchased by, or otherwise associated with, a customer. The group of computing resources to which the model computing resource is deployed may sometimes be referred to as a customer fleet. In some examples, a user may connect to a model computing resource in various different modes, such as an administrative mode and a test mode. In some cases, the user may connect to the model computing resource in the administrative mode, for example to install and customize and applications, apply group policies and set restrictions, and perform other operations. Also, in some cases, the user may connect to the model computing resource in the test mode, for example to test applications, customizations, settings, restrictions, and other features. The user may often switch repeatedly between the administrative mode and the test mode, such as to configure and test various different features. In some examples, entry of security information may be required each time that the user switches between modes. Thus, in some cases, the above described techniques may be particularly advantageous in these circumstances, for example by saving the user from having to repeatedly enter security information, reducing the risk that the security information will be captured and used by unauthorized individuals, and in other ways.

In some examples, prior to requesting access to the computing resource, the user may first be required to log-on or connect to a computing service that provides the computing resource. In some cases, certain security information, such as a username, account, password and/or other identifiers, may be required in order to connect to the computing service. In some cases, the security information that is required to connect to the computing service may be referred to as service-level security information, while the security information that is required to access the computing resource may be referred to as resource-level security information. In some examples, the above described techniques may be particularly well suited for scenarios when users are required to provide both service-level and resource-level security information. This is because, in these scenarios, when a user attempts to access a computing resource, it is assumed that the user was previously required to provide the service-level security information, thereby confirming that the user is an authorized and appropriate (e.g., non-malicious) user. Thus, in these scenarios, because the user is pre-confirmed by the service-level security information, any risk associated with generating and entering the resource-level security information on the user's behalf may be reduced.

FIG. 1 is a diagram illustrating an example secure remote access system for a networked computing session that may be used in accordance with the present disclosure. As shown in FIG. 1, client 110, such as a desktop, laptop, tablet, phone, or other computing device, communicates with computing service 120 over at least one network 115. Network 115 may include at least one local area network (LAN) and/or at least one wide area network (WAN) such as the Internet. In one specific example, computing service 120 may be a cloud service that operates one or more data centers or other large-scale collections of computing resources, such as virtual machines, servers and/or other computing resources. As also shown in FIG. 1, a communication session 116 is established between client 110 and computing service 120. As part of the communication session 116, image data 117 may be streamed, for example from streaming service 121 of computing service 120 to client 110. Streaming of data may refer to a technique in which portions of data may be received and presented (e.g., displayed) while subsequent portions of the data continue to be transmitted. The streamed image data may be associated with a user interface generated by computing resource 123.

In some examples, the computing resource 123 may be a virtual machine instance or other computing instance operated by the computing service 120. For example, in some cases, the computing resource 123 may be a computing instance that executes a selected operating system, for example having a custom shell or other specialized features. In some examples, the computing resource 123 may provide one or more user interfaces, and image data 117 may include image data representing the user interfaces of the computing resource 123. For example, in some cases, various applications may be launched and executed on the computing resource, and image data 117 may include image data for windows and other interfaces provided by these applications. These applications may include, for example, word processing applications, spreadsheet applications, email and communication applications, and many other types of applications. The image data 117 may include, for example, pixel value data corresponding to rendered images of the user interfaces of the computing resource 123, such as interfaces for a resource log-in page, a resource desktop, launched and executed applications, and other interfaces. In some examples, audio data associated with the computing resource 123 may also be streamed from the computing service 120 to the client 110.

In the example of FIG. 1, a browser 111, such as a web or other browsing application, may be employed to manage the communication session 116 at client 110. For example, the browsing application may 111 may be used to communicate with the computing service 120 via transmission of input data 118, such as to log-in to (or otherwise access) the computing service 120, to log-in to (or otherwise access) the computing resource 123, to access, configure, and interact with various features of the computing resource 123, and for other operations.

Figure 2:
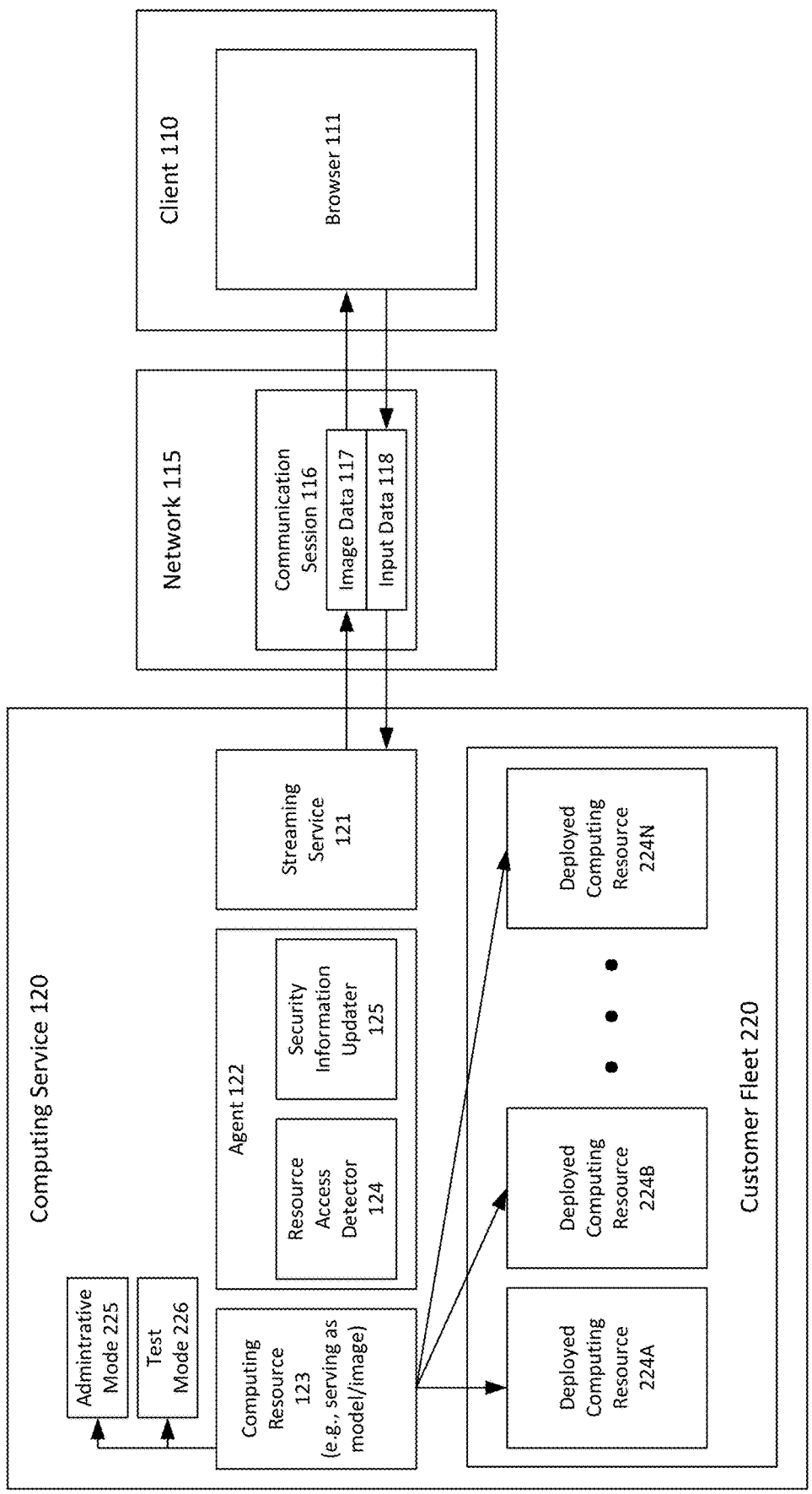
FIG. 2 is diagram illustrating an example secure remote access system for a model computing resource that may be used in accordance with the present disclosure.

In some examples, computing resource 123 may be a model computing resource, such as a virtual machine image or another computing resource image, that may be copied or otherwise deployed to other computing resources that are purchased by, or otherwise associated with, a customer. Referring now to FIG. 2, an example is shown in which computing resource 123 serves as a model computing resource (e.g., virtual machine image). As shown in FIG. 2, upon being configured by a customer or other user, computing resource 123 may be copied (or otherwise deployed) to deployed computing resources 224A-N. In the example of FIG. 2, deployed computing resources 224A-N are included in a customer fleet 220.

Additionally, in the example of FIG. 2, client 110 may connect to the computing resource 123 in various different modes, such as an administrative mode 225 and a test mode 226. In some cases, client 110 may connect to the computing resource 123 in the administrative mode 225, for example to install and customize applications and software (e.g., modify configuration files, set registry settings, etc.), apply group policies, set restrictions, and perform other operations. Also, in some cases, client 110 may connect to computing resource 123 in the test mode 226, for example to test applications, customizations, settings, restrictions, and other features. Client 110 may often switch repeatedly between the administrative mode 225 and the test mode 226, such as to configure and test various different features. In some examples, entry of security information may be required each time that the user switches between modes.

Figure 3:
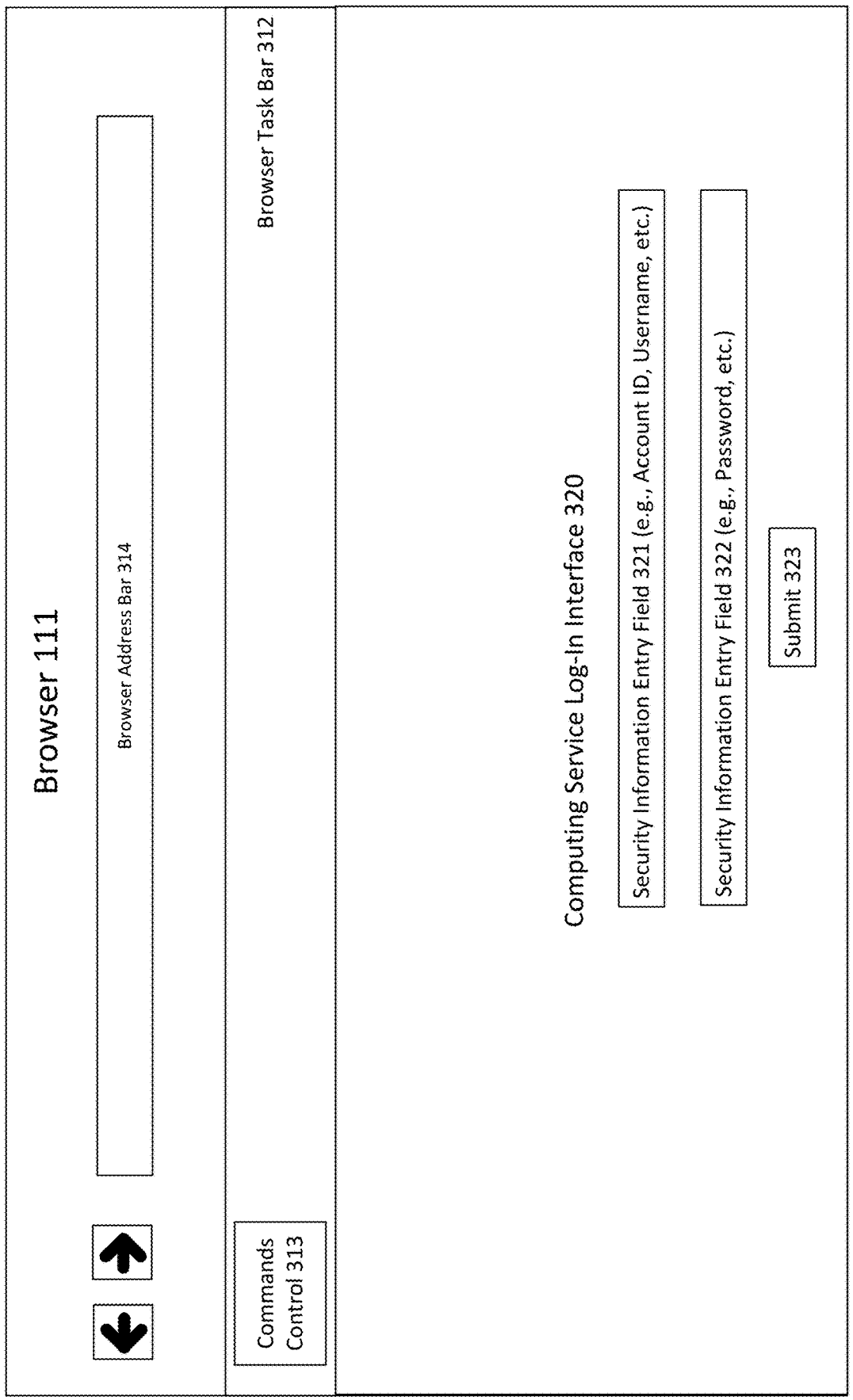
FIG. 3 is diagram illustrating an example computing service log-in interface that may be used in accordance with the present disclosure.

In some examples, a user operating client 110 may access computing resource 123 and/or other computing resources by first logging-in (or otherwise connecting to) computing service 120. For example, the user may be required to provide certain security information for connecting to the service, referred to herein as service-level security information. In some examples, the service level security information may include a username, account, password and/or other identifiers. Referring now to FIG. 3, an example computing service log-in interface 320 will now be described in detail. In particular, in some examples, browser 111 of client 110 may be used to navigate to the computing service log-in interface 320, such as by entering a web address associated with computing service 120 into the browser address bar 314. Upon entering of the web address, the computing service log-in interface 320 may be displayed by browser 111. In the example of FIG. 3, the computing service log-in interface 320 includes two security information entry fields 321 and 322. In one specific example, field 321 may be for entering a username or account identifier, and field 322 may be for entering a corresponding password. Upon entering the appropriate security information into fields 321 and 322, the submit button 323 may be selected to submit the entered security information, for example to the computing service 120 for validation. In some examples, the security information entered into fields 321 and 322 may correspond to an administrator account or may otherwise indicate that a user of client 110 is an administrator. This administrator status may allow client 110 to access certain computing resources, privileges, and/or features within computing service 120, such as, for example, the ability to access, build, and configure an image or other model computing resource, the ability to access a model computing resource in administrative mode 225 and test mode 226, and/or the ability to access other resources and features.

Figure 4:
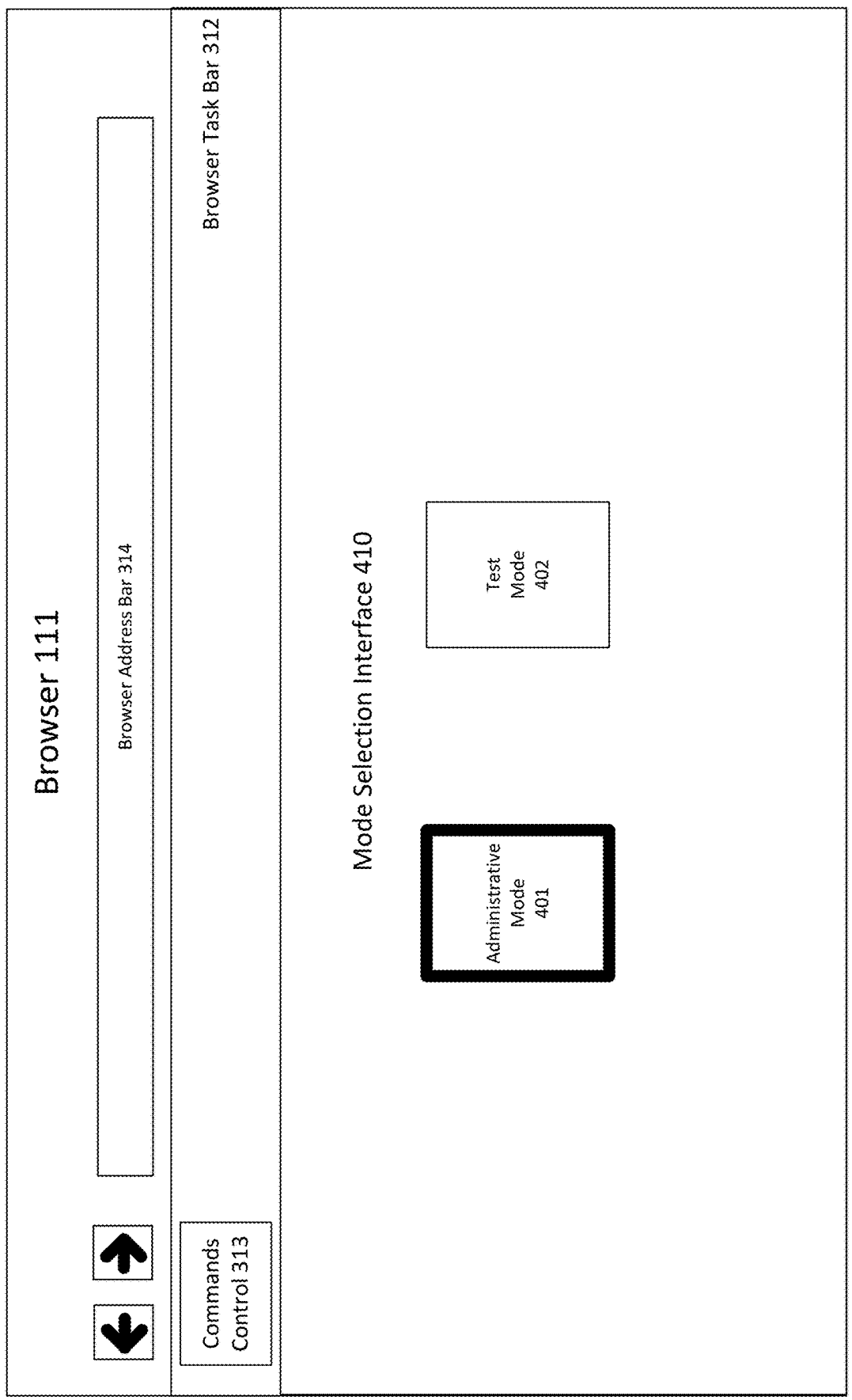
FIG. 4 is a diagram illustrating an example mode selection interface for a model computing resource that may be used in accordance with the present disclosure.

In some cases, upon validation of the service-level security information entered via computing service log-in interface 320, client 110 may be granted access to computing service 120, and the user of client 110 may select a particular resource or feature provided by computing service 120 with which the user wishes to interact. For example, in some cases, the user may wish to access and configure a model computing resource, such as depicted in the example of FIG. 2. In some examples, the user may request access to such a model computing resource via various tabs or menu options for various resources that may be provided, for example via one or more interfaces displayed in browser 111. In some examples, upon requesting access to a model computing resource, the user may be provided with various options to select a mode for interacting with the model computing resource. Referring now to FIG. 4, an example mode selection interface 410 for a model computing resource will now be described in detail. In particular, as shown in FIG. 4, mode selection interface 410 displays an administrative mode button 401 and a test mode button 402. Administrative mode button 401 may be selected to interact with the model computing resource in an administrative mode as described above, while test mode button 402 may be selected to interact with the model computing resource in a test mode as also described above. In the example of FIG. 4, administrative mode button 401 is selected, as indicated by the thick bold border of button 401.

Figure 5:
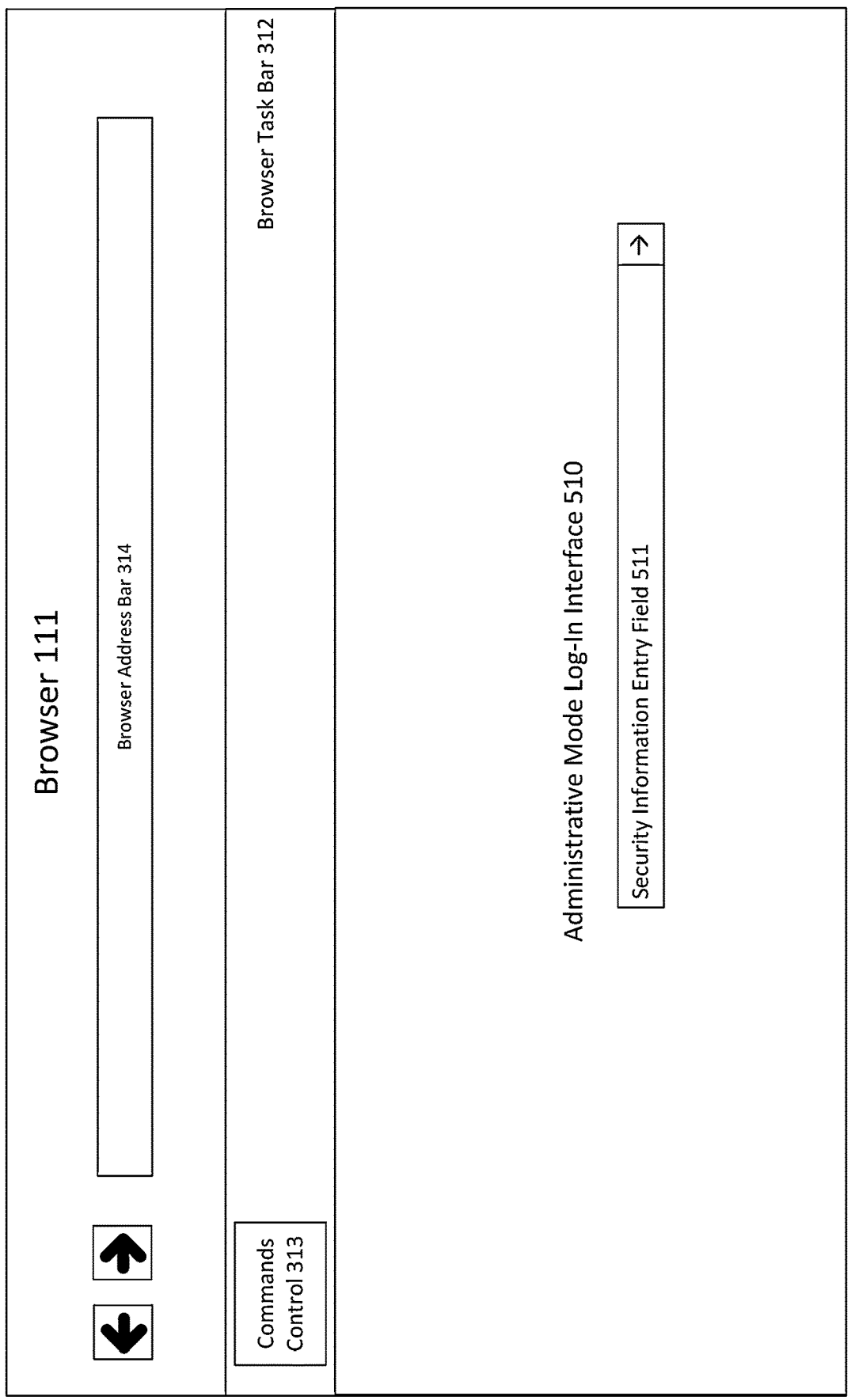
FIG. 5 is a diagram illustrating an example administrative mode log-in interface that may be used in accordance with the present disclosure.

Upon selecting the administrative mode via button 401, the user may be prompted to enter appropriate security information, such as a password or other identifier, in order to log-in to, or otherwise access, the model computing resource in the administrative mode. Referring now to FIG. 5, an example administrative mode log-in interface 510 will now be described in detail. In particular, as shown in FIG. 5 example administrative mode log-in interface 510 includes a security information entry field 511 for entering security information, such as a password or other identifier, in order to log-in to the model computing resource in the administrative mode. As described above, in some conventional resource access techniques, a user may type or otherwise manually enter a password or other security information into a field such as entry field 511. As also described above, however, the requirement for a user to enter security information may have a number of associated drawbacks, such as forcing users to generate and memorize potentially complex passwords, risking that users may forget passwords or write down or otherwise potentially expose passwords to unauthorized individuals, and other drawbacks. Additionally, another complication associated with security information in remote networked contexts is that the security information may sometimes be susceptible to being compromised when it is being entered into a client interface, such as browser 111, and/or transmitted over a network.

Figure 6:
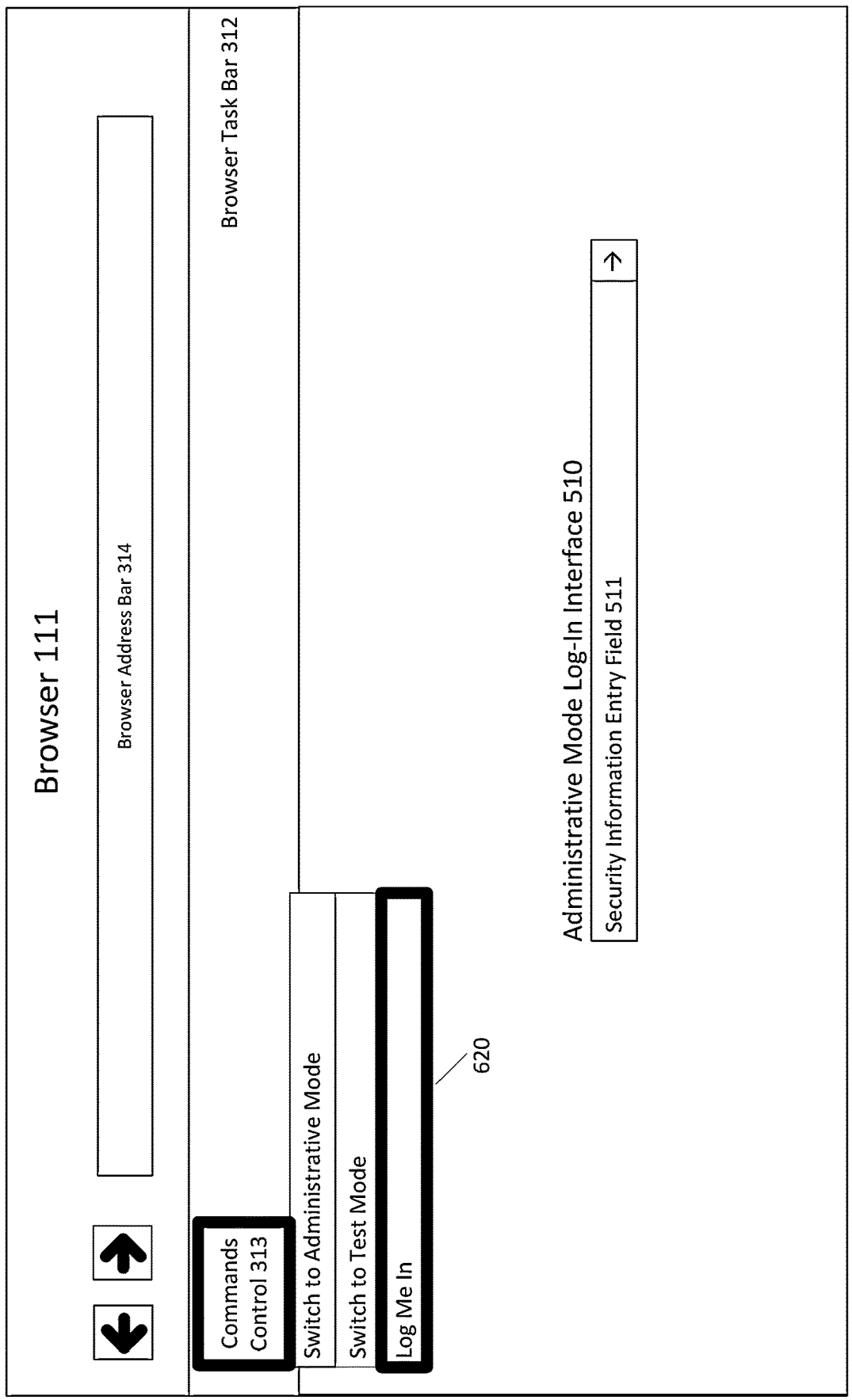
FIG. 6 is a diagram illustrating an example administrative mode log-in request that may be used in accordance with the present disclosure.

For these and other reasons, techniques may be employed in which security information may generated and entered on behalf of the user, as will now be described in detail. In particular, rather than having the user generate, memorize, and manually enter a password or other security information into security information entry field 511, the user may instead request the assistance of computing service 120 to log-in the user. In particular, referring now to FIG. 6, an example administrative mode log-in request will now be described in detail. Specifically, as shown in FIG. 6, a user may select commands control 313 provided by the browser 111 within the browser task bar 312. The selection of commands control 313 is indicated by the thick bold border surrounding commands control 313 in FIG. 6. Selection of commands control 313 may cause a drop down menu 620 to be displayed, and the menu 620 may include various options. In the example of FIG. 6, the user has selected the Log Me In option as indicated by the thick bold border surrounding the Log Me In option.

Referring back to FIG. 2, an indication of the selection of the Log Me In option may be transmitted from the client 110 to the computing service 120 as input data 118. The indication of the selection of the Log Me In option may be received by security information updater 125 of agent 122, which may process the selection of the Log Me In option by updating (e.g., setting, modifying, etc.) a password or other security information for the user's account to access the computing resource 123 in the administrative mode 225. In some examples, the security information updater 125 may generate a random or partially random value to which to set the password or other security information for the user. Upon generating the updated security information, the security information updater 125 may notify the computing resource 123 of the updated security information, for example by providing an indication of the updated security information, a name or identifier of the user and/or the user's account, and an identifier of the corresponding access mode (e.g., administrative mode or test mode) to the computing resource 123. In some examples, the security information updater 125 may communicate this information to the computing resource 123 via one or more calls to an application programming interface (API) and/or other interface associated with the computing resource 123.

Figure 7:
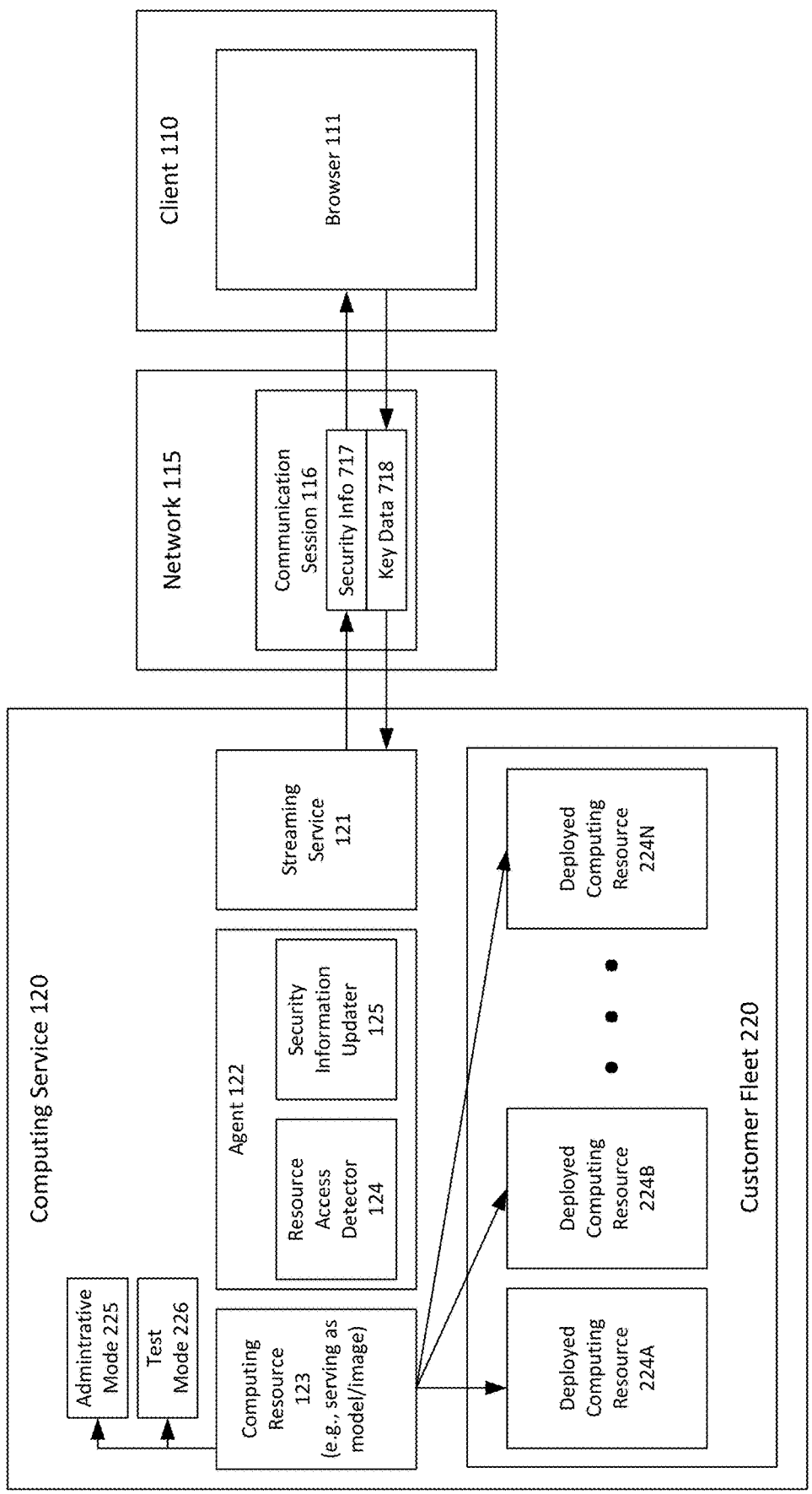
FIG. 7 is a diagram illustrating example transmissions of security information and key data that may be used in accordance with the present disclosure.

Furthermore, upon being generated, the updated security information may be transmitted by the streaming service 121 from the computing service 120 to browser 111 at client 110. Referring now to FIG. 7, example transmissions of security information and key data will now be described in detail. In particular, as shown in FIG. 7, updated security information generated by the agent 122 may be transmitted from the computing service 120 to the browser 111 as security information 717. Upon receiving the security information 717, the browser 111 may, in turn, transmit, back to the computing service 120, data for entry of the updated security information. In particular, in the example of FIG. 7, the browser 111 transmits key data 718, such as data associated with keyboard or keypad selections of the characters included in the security information 717. Thus, in some examples, the user of the client does not enter the security information 717 into the client, such as by manually typing characters on a keyboard or keypad. Rather, the browser 111 may instead generate and transmit the key data 718 on the user's behalf, without requiring any activation or selection of keys by the user. Thus, in some cases, the security information 717 may never actually be revealed to, or known by, the user. In some examples, the key data 718 may be transmitted to the computing service 120 using a built-in channel (e.g., a key input channel) of a streaming protocol that is employed for the computing session 116. It is noted, however, that the key data 718 may be transmitted in other ways, such as using a custom channel of a streaming protocol or via other transmission techniques.

Figure 8:
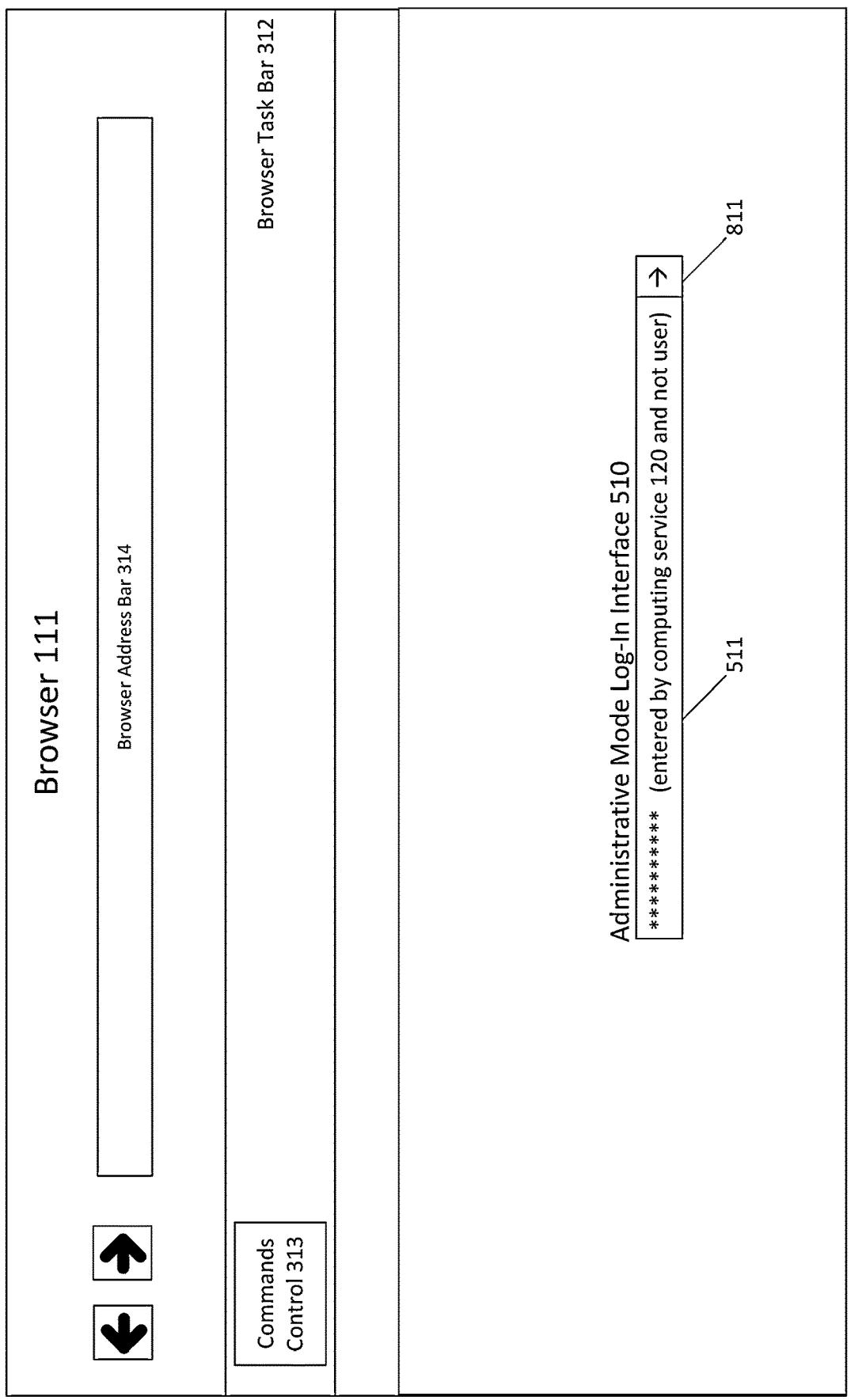
FIG. 8 is a diagram illustrating an example entry of administrative mode security information that may be used in accordance with the present disclosure.

The key data 718 may be received at computing service 120 by streaming service 121, which may, in turn, use the received key data 718 to enter the security information into computing resource 123 on behalf of the user. Referring now to FIG. 8, an example entry of administrative mode security information will now be described in detail. In particular, as shown in FIG. 8, the security information 717 (represented by the series of * characters in FIG. 8) is entered into field 511 by the computing service 120 on the user's behalf. The security information 717 is not typed or otherwise manually entered into the client 110 by the user of the client, and may not be revealed to, or known by, the user. Upon entry of the security information 717, the streaming service 120 may select the submit button 811 to submit the entered security information 717 into the computing resource 123. The computing resource 123 may then validate the entered security information 717, such as by comparing the security information entered in field 511 to the updated security information provided by the security information updater 125. Assuming that there are no errors associated with the transmission or entry of the security information 717 into field 511, it is expected that the security information will be validated and that the user will be granted access to computing resource 123 in the administrative mode 225.

Thus, as described above, the user may be granted access to the computing resource 123 without the need to generate, memorize, and enter a password or other security information. As also described above, however, another complication associated with security information in remote networked contexts is that the security information may sometimes be susceptible to being compromised when it is being entered into a client interface, such as browser 111, and/or transmitted over a network. For these and other reasons, techniques may be employed in which the security information 717 may again be updated (e.g., modified) when the client 110 successfully accesses the computing resource 123. In particular, referring back to FIGS. 1, 2 and 7, it is seen that the agent 122 includes a resource access detector 124, which may be employed to detect a successful log-in or other access of the computing resource 123 by a client 110. For example, in some cases, when a client 110 successfully logs-in to or otherwise accesses the computing resource 123, the computing resource 123 may generate a notification of an event, such as a log-in or connection event. In some examples, the resource access detector 124 may subscribe to the computing resource 123 to receive these and other similar event notifications in order to detect when a client 110 successfully logs-in to or otherwise accesses the computing resource 123. Upon receiving a notification of such an event, the resource access detector 124 may trigger the security information updater 125 to again update the security information for the user or the user's account for the computing resource in the corresponding mode (e.g., administrative mode in this example) in which the user has just accessed the computing resource 123. The security information updater 125 may then update the security information and notify the computing resource 123 of the updated security information, for example using the process described above. By changing the security information in response to a successful log-in, the risk of the security information being captured and used by unauthorized or malicious individuals is reduced. In particular, even in circumstances when the security information may be captured by an unauthorized individual, the likelihood is increased that the captured security information will be out-of-date and invalid by the time that the unauthorized individual attempts to use it.

Figure 9:
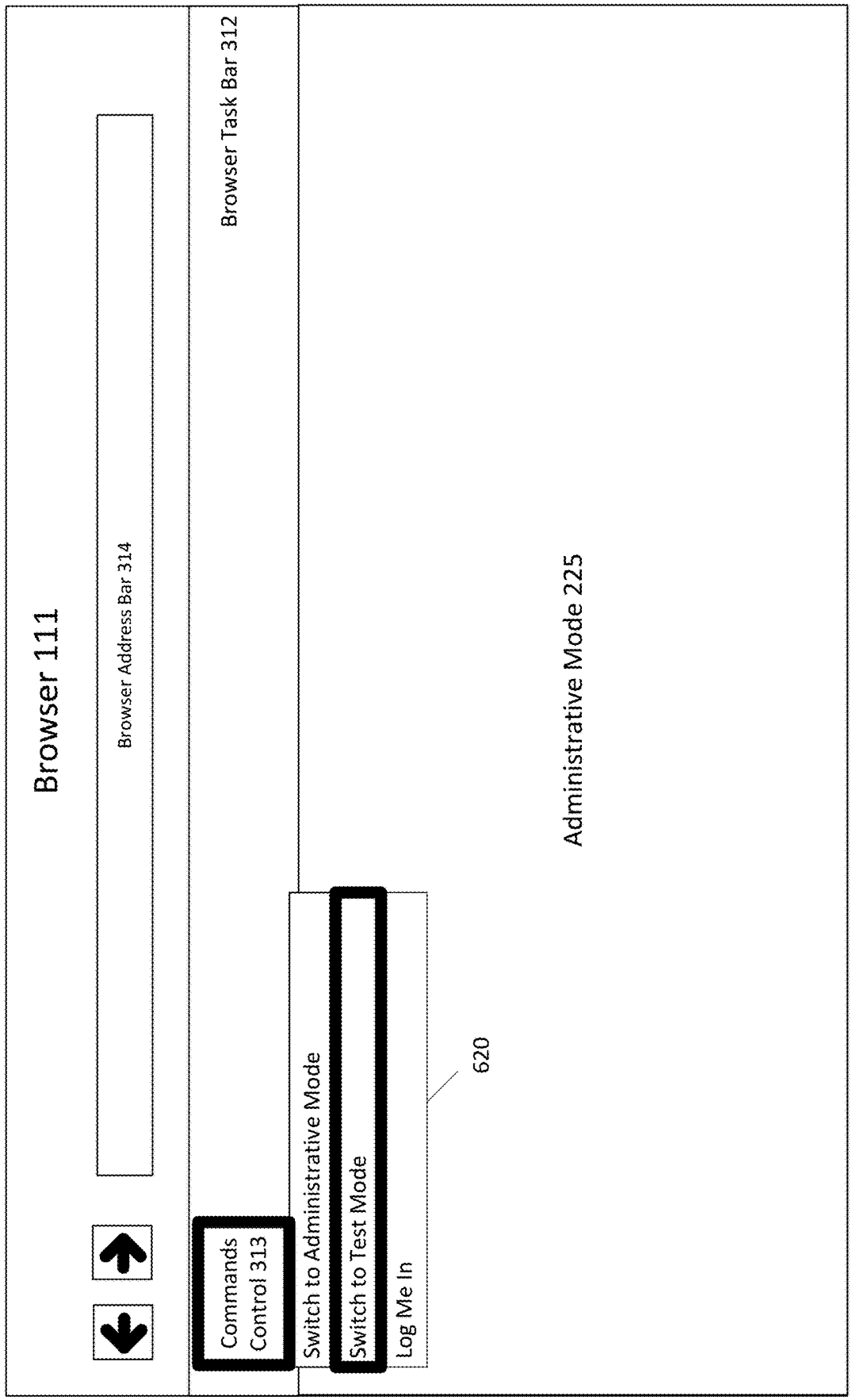
FIG. 9 is a diagram illustrating an example request to switch to test mode that may be used in accordance with the present disclosure.

As described above, in some cases, when configuring a virtual machine image or other model computing resource, client 110 may often switch repeatedly between the administrative mode 225 and the test mode 226, such as to configure and test various different features. In some examples, entry of security information may be required each time that the user switches between modes. Referring now to FIG. 9, it seen that, while logged-in and connected to the computing resource 123 in the administrative mode 225, a user may wish to switch to the test mode 226. In the example of FIG. 9, to switch to the test mode 226, the user may select the Switch to Test Mode option from the drop down menu 620. In some examples, this may cause the browser 111 to perform a series of actions on the user's behalf, for example including providing an input for switching between modes (e.g., a Ctrl+Alt+Delete input), selecting a mode to switch to (e.g., test mode 226), and sending a request to the computing service 120 to access the computing resource 123 in the switched-to mode (e.g., similar to selection of the Log Me In option described above with respect to FIG. 6).

Figure 10:
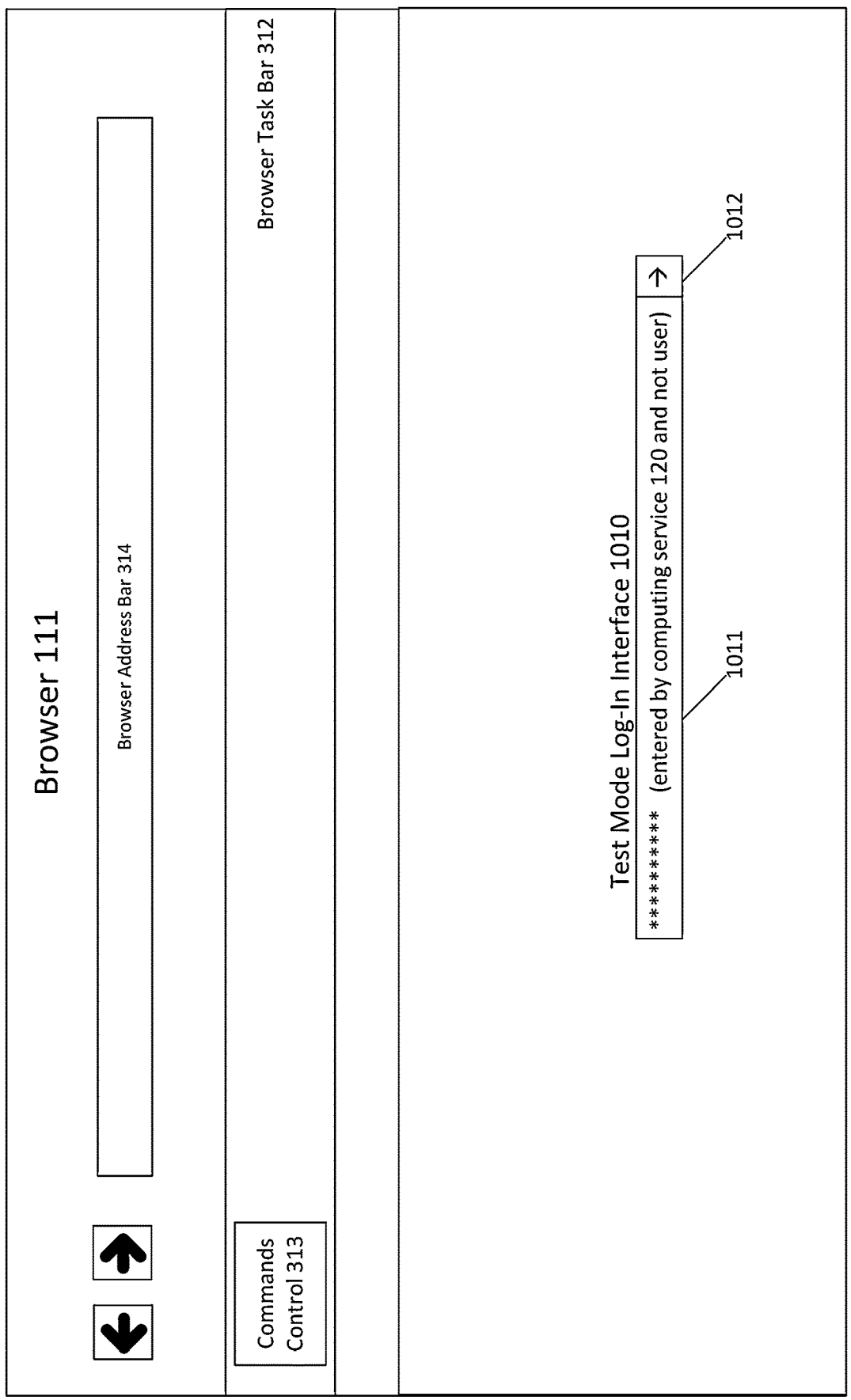
FIG. 10 is a diagram illustrating an example entry of test mode security information that may be used in accordance with the present disclosure.

When the browser 111 performs the above actions, an interface for logging-in to the test mode 226 may be generated by the computing resource 123 and displayed in browser 111. Referring now to FIG. 10, an example entry of test mode security information will now be described in detail. In particular, as shown in FIG. 10, selection of the Switch to Test Mode option from the drop down menu 620 of FIG. 9 may cause the browser 111 to display a test mode log-in interface 1010 for accessing the computing resource 123 in the test mode 226. The test mode log-in interface 1010 includes an entry field 1011 for entering of security information for accessing the computing resource 123 in the test mode 226. Selection of the Switch to Test Mode option may also cause the browser 111 to send a request to the computing service 120 to access the computing resource 123 in the test mode 226. Upon receiving this request, the computing service 120 may update (e.g., set, modify, etc.) a password or other security information for the user's account to access the computing resource 123 in the test mode 226. The computing service 120 may also notify the computing resource 123 of the updated security information. These steps may be performed similarly to the steps for updating the security information described in detail above with respect to the administrative mode.

Furthermore, upon being generated, the updated security information may be transmitted from the computing service 120 to browser 111 at client 110. Upon receiving the security information, the browser 111 may, in turn, transmit, back to the computing service 120, data for entry of the updated security information. This data may then be used by the computing service 120 to enter the security information into computing resource 123 on behalf of the user. These steps may also be performed similarly to the steps for entering the security information described in detail above with respect to the administrative mode. As shown in FIG. 10, the security information (represented by the series of * characters in FIG. 10) is entered into field 1011 by the computing service 120 on the user's behalf Upon entry of the security information, the computing service 120 may select the submit button 1012 to submit the entered the security information into the computing resource 123. The computing resource 123 may then validate the entered security information, and the user may be granted access to computing resource 123 in the test mode 226. Additionally, similar to the process described above for the administrative mode, the access of the computing resource in the test mode 226 may be detected by the computing service 120, and this may trigger the computing service 120 to again update the security information for user or the user's account for the computing resource 123 in the test mode 226.

Figure 11:
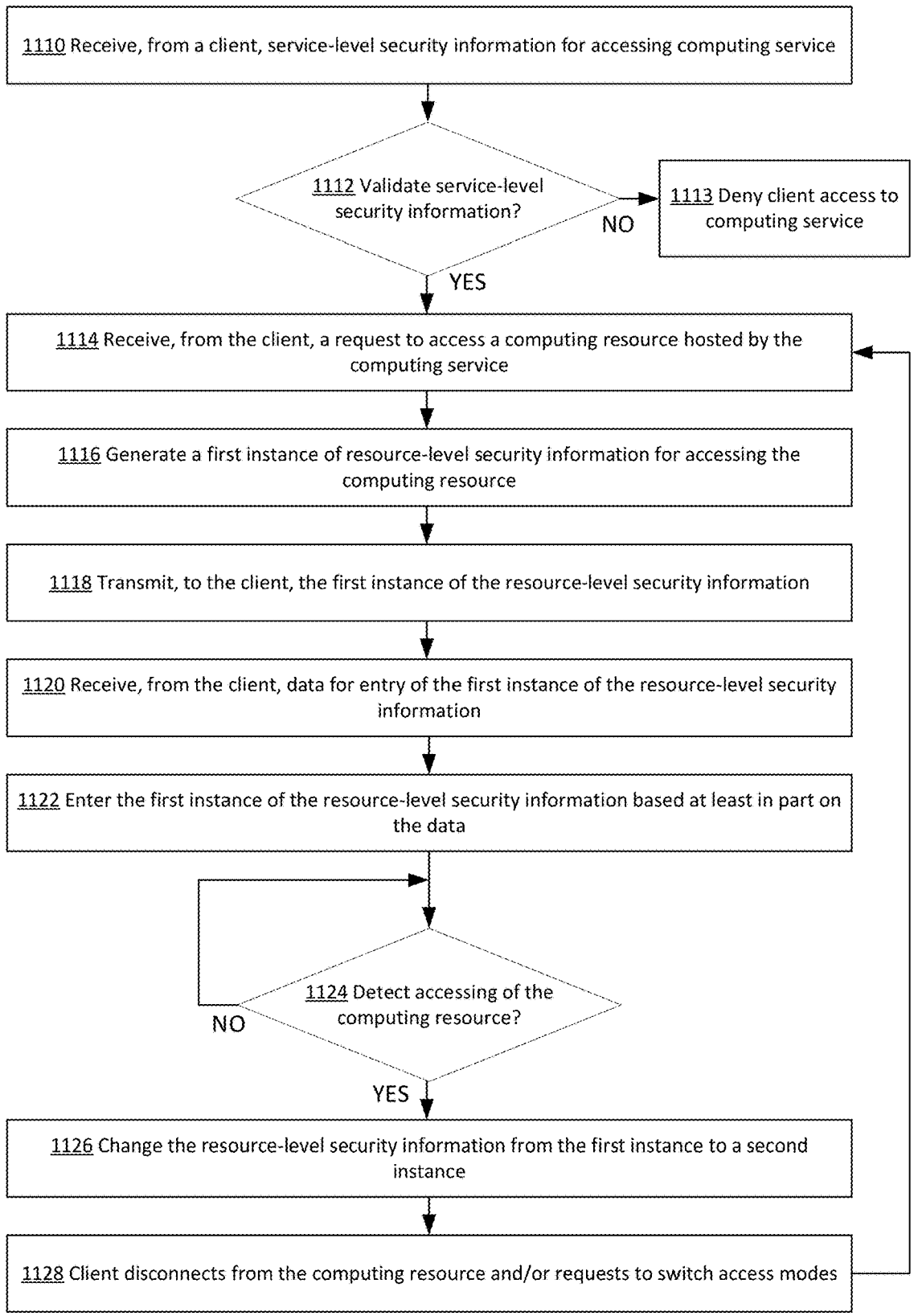
FIG. 11 is a flowchart illustrating an example process for controlling accessing of a computing resource that may be used in accordance with the present disclosure.

FIG. 11 is a flowchart illustrating an example process for controlling accessing of a computing resource that may be used in accordance with the present disclosure. As shown, the process of FIG. 11 is initiated at operation 1110, at which service-level security information for accessing a computing service is received from a client. As set forth above, the client may provide service-level security information, such as a username, account, password and/or other identifiers. As also set forth above, the service-level security information may be provided using an interface on the client, such as browser 111 (e.g., a web browser or other client interface).

At operation 1112, it is determined whether the service-level security information is validated. For example, it may be determined whether a password or other service-level security information matches a stored password or other service-level security information for a particular client, user, account, and/or other entity. If the service-level security information is not validated, then the client may be denied access to the computing service at operation 1113.

By contrast, if the service-level security information is validated, then the process may proceed to operation 1114, at which a request is received, from the client, to access a computing resource hosted by the computing service. In one specific example, the request may be issued by selecting a Log Me In option, such as shown in FIG. 6. The request may be transmitted by the client to the computing service. In some examples, the request may be for accessing the computing resource in an administrative mode and/or a test mode. In some examples, the computing resource may be a model computing resource (e.g., image) that is deployed to a plurality of other computing resources, such as shown in FIG. 2. Also, in some examples, the computing resource may be a virtual machine instance or other computing instance that executes an operating system (OS) that is loaded onto the computing instance.

At operation 1116, a first instance of the resource-level security information is generated for accessing the computing resource. The first instance of the resource-level security information may be generated based, at least in part, on the request received at operation 1114. As set forth above, in some examples, the resource-level security information may include a password or other identifier. Also, in some examples, the first instance of the resource-level security information may include a particular value for the password or other identifier. The first instance of the resource-level security information may be for accessing the computing resource in, for example, an administrative mode and/or a test mode. In some cases, the first instance of the resource-level security information may be generated wholly or partially at random. Generating of the first instance of the resource-level security information may include setting the security information to an initial value and/or changing a value of the security information from a prior value to a new value. In some examples, upon generating of the first instance of the resource-level security information, an indication of the first instance of the resource level security information may be provided to the computing resource, such as via an API or other interface associated with the computing resource.

At operation 1118, the first instance of the resource-level security information is transmitted by the computing service to the client. The first instance of the resource-level security information may be received by the client, for example by a browser or other client interface. As set forth above, in some examples, the client may be required to provide service-level security information for accessing the computing service (e.g., operation 1110) prior to the transmitting of the first instance of the resource-level security information to the client. Upon receipt of the first instance of the resource-level security information, the client may generate and transmit, back to the computing service, data for entry of the first instance of the resource-level security information. As set forth above, the data for entry of the first instance of the resource-level security information may include key data corresponding to characters included in the first instance of the resource-level security information, such as data associated with keyboard or keypad selections of the characters. Thus, in some examples, the user of the client does not enter the first instance of the resource-level security information into the client, such as by manually typing characters on a keyboard or keypad. Rather, the client may instead generate and transmit the data for entry of the first instance of the resource-level security information on the user's behalf, without requiring any activation or selection of keys by the user. Thus, in some cases, the first instance of the resource-level security information may not be revealed to the user of the client. In some examples, the data for entry of the first instance of the resource-level security information may be transmitted to the computing service using a channel (e.g., a built-in channel, a custom channel, etc.) of a streaming protocol that is used to transmit image data from the computing service to the client.

At operation 1120, the data for entry of the first instance of the resource-level security information is received from the client by the computing service. At operation 1122, the first instance of the security information is entered based, at least in part, on the data received at operation 1120. In particular, in some examples, the first instance of the security information may be entered into the computing resource by the computing service, for example as shown in FIG. 8, such as by entering key data provided by the client into the computing resource. Upon entry of the first instance of the resource-level security information to the computing resource, the client may be granted access to the computing resource.

At operation 1124, it is determined whether an accessing of the computing resource is detected. As set forth above, in some examples, an agent of the computing service may monitor the computing resource to detect when the computing resource is accessed by a client. For example, in some cases, the computing resource may generate a notification of an event associated with the accessing of the computing resource, such as a log-in or connection event, when the computing resource is accessed by a client. In some examples, the agent may register to receive notifications of an event associated with the accessing of the computing resource. Upon receiving a notification of such an event, the agent may detect that the computing resource has been accessed. The detected accessing of the computing resource may be effectuated by the entering of the first instance of the security information at operation 1120.

Based at least in part upon detecting accessing of the computing resource at operation 1124, the resource-level security information is changed from the first instance to a second instance at operation 1126. For example, operation 1126 may include changing the security information from a first value associated with the first instance to a second value associated with the second instance. In some examples, upon changing of the resource-level security information from the first instance to the second instance, an indication of the second instance of the resource level security information may be provided to the computing resource, such as via an API or other interface associated with the computing resource. As set forth above, by changing the security information in response to a successful log-in, the risk of the security information being captured and used by unauthorized or malicious individuals is reduced. In particular, even in circumstances when the first instance security information may be captured by an unauthorized individual, the likelihood is increased that the captured first instance security information will be out-of-date and invalid (e.g., replaced by the second instance) by the time that the unauthorized individual attempts to use it.

Upon accessing the computing resource, the client may interact with the computing resource to perform various tasks. In some examples, image data generated by the computing resource may be streamed to the client and displayed by the client. This image data may include image data associated with interfaces of the computing resource, such as interfaces or windows or various applications that may be launched and executed on the computing resource. In some cases, if the client has connected to the computing resource in the administrative mode, the client may install and customize applications and software (e.g., modify configuration files, set registry settings, etc.), apply group policies, set restrictions, and perform other operations. Also, in some cases, if the client has connected to the computing resource in the test mode, the client may test applications, customizations, settings, restrictions, and other features.

At operation 1128, the client disconnects from the computing resource and/or requests to switch access modes. For example, operation 1128 may include issuing a request to switch from the administrative mode to the test mode, such as in response to selection of the Switch to Test Mode option as shown in FIG. 9. As another example, operation 1128 may include issuing a request to switch from the test mode to the administrative mode, such as in response to selection of the Switch to Administrative Mode option. As yet another example, operation 1128 may include disconnecting of the client from the computing resource, for example after the user has completed his or her desired interactions with the computing resource.

Subsequent to operation 1128, the process of FIG. 11 may eventually return to operation 1114. In some examples, if the client has disconnected from the computing service, then it may be necessary to also repeat operations 1110 and 1112 prior to returning to operation 1114. Upon returning to operation 1114, operations 1114-1128 may be repeated. For example, if the user switches from administrative mode to test mode, then operations 1114-1128 may be repeated for accessing the computing resource in the test mode. As another example, if the user switches from test mode to administrative mode, then operations 1114-1128 may be repeated for accessing the computing resource in the administrative mode. In some cases, repeating of operations 1114-1128 may include generating subsequent instances of the security information. For example, in some cases, on the first repetition of operation 1116, a third instance of the security information may be generated, and, on the first repetition of operation 1126, the security information may be changed from the third instance to a fourth instance. Thus, as described above, the process of FIG. 11 may allow switching between modes (or repeated access of a computing resource in the same mode) without requiring entry or re-entry of security information by the user.

Figure 12:
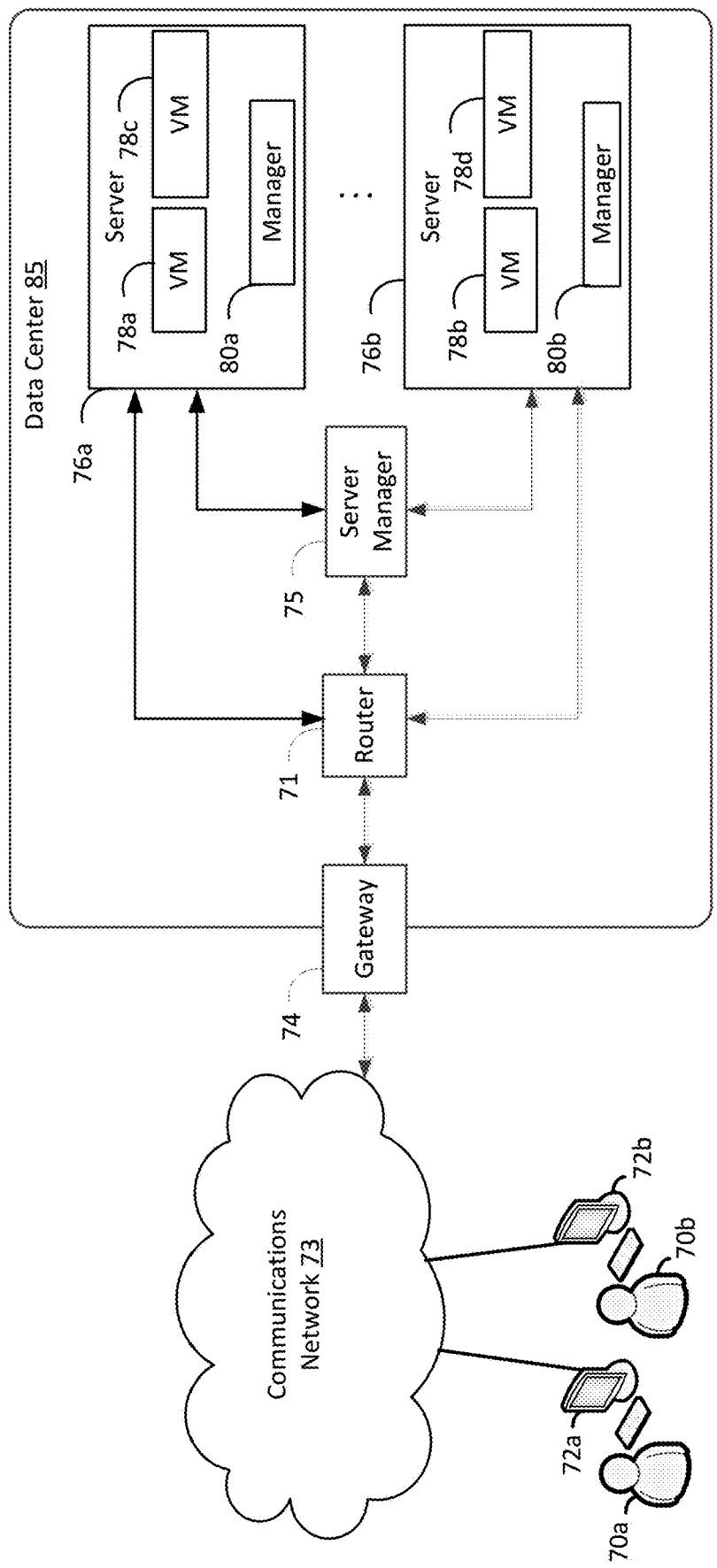
FIG. 12 is a diagram illustrating an example system for transmitting and providing data that may be used in accordance with the present disclosure.

An example system for transmitting and providing data will now be described in detail. In particular, FIG. 12 illustrates an example computing environment in which the embodiments described herein may be implemented. FIG. 12 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a*-*d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 12, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 12 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 12, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 12, a server manager 75 is also employed to at least in part direct various communications to, from and/or between servers 76a and 76b. While FIG. 12 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 12 has been greatly simplified and that many more networks and networking devices may be utilized to interconnect the various computing systems disclosed herein. These network topologies and devices should be apparent to those skilled in the art.

It should also be appreciated that data center 85 described in FIG. 12 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 13:
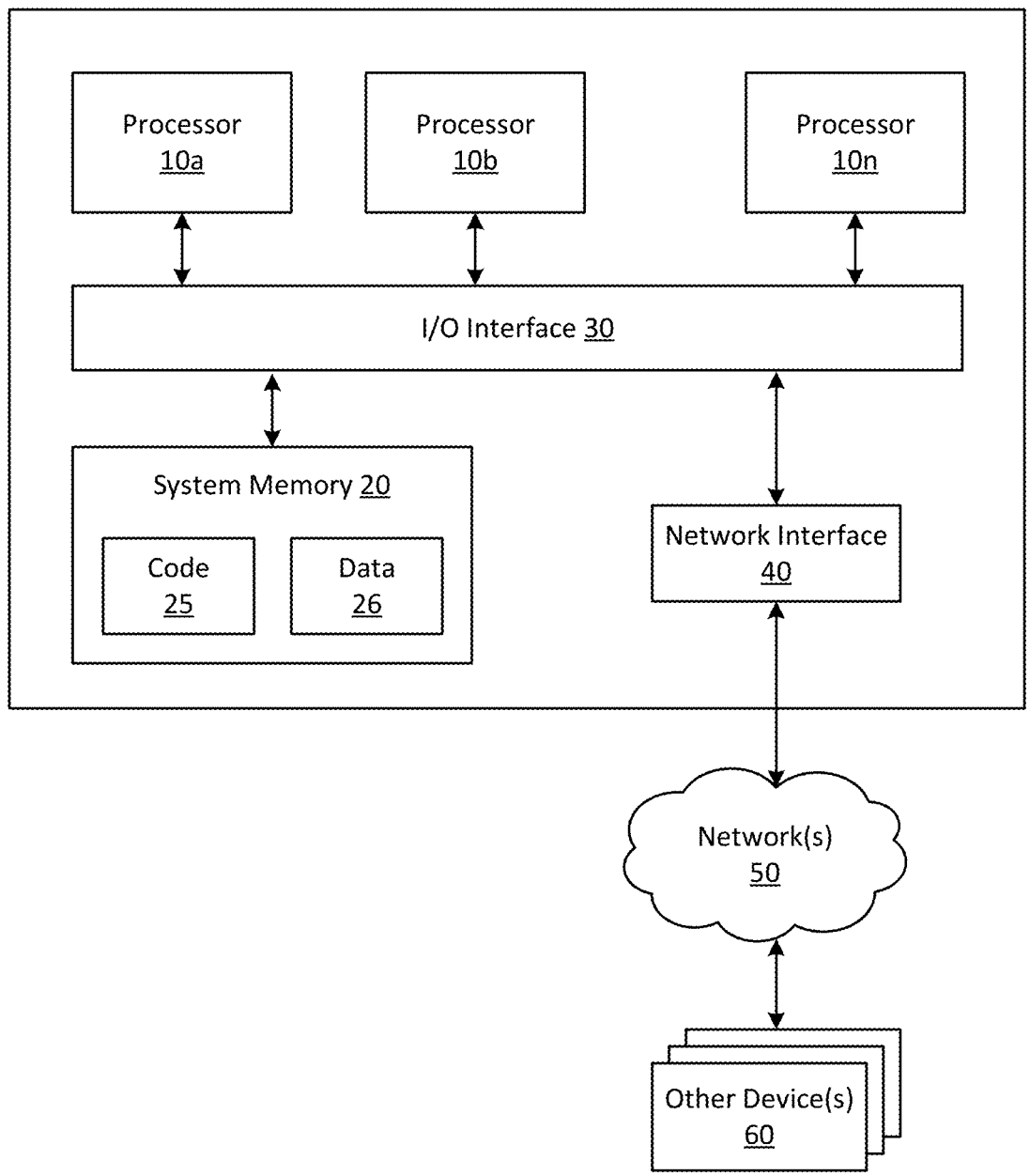
FIG. 13 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 13 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system perform operations comprising:
   receiving, from a client, a request associated with switching operation of a computing resource from a first mode to a second mode;
   transmitting, to the client, a first security information instance that, when entered into the computing resource and validated, grants access to the computing resource in the second mode;
   receiving, from the client, first data for entry of the first security information instance, wherein the first data for the entry of the first security information instance is received over a channel of a streaming protocol used to transmit image data, wherein the image data is generated by the computing resource and is streamed to the client, and wherein a first portion of the image data is received and presented while a second portion of the image data is transmitted;
   entering, based at least in part on the first data for the entry of the first security information instance, the first security information instance;
   detecting the accessing of the computing resource, the accessing effectuated by the entering of the first security information instance; and changing the first security information instance to a second security information instance that, when entered into the computing resource and validated, grants access to the computing resource in the second mode.

2. The computing system of claim 1, wherein the computing resource is hosted by a service, and wherein the client is required to provide other security information for accessing the service prior to the transmitting of the first security information instance to the client.

3. The computing system of claim 1, wherein the first data for the entry of the first security information instance comprises key data corresponding to characters included in the first security information instance.

4. The computing system of claim 1, wherein the computing resource is a model computing resource that is deployed to a plurality of other computing resources.

5. The computing system of claim 1, wherein the first mode is an administrative mode and the second mode is a test mode.

6. The computing system of claim 1, wherein the first mode is a test and the second mode is an administrative mode.

7. The computing system of claim 1, wherein the first security information instance is not entered into the client by a user of the client.

8. The computing system of claim 1, further comprising registering to receive a notification of an event associated with the accessing of the computing resource.

9. A computer-implemented method comprising:
receiving, from a client, a request associated with switching operation of a computing resource from a first mode to a second mode;
transmitting, to the client, a first security information instance that, when entered into the computing resource and validated, grants access to the computing resource in the second mode;
receiving, from the client, first data for entry of the first security information instance wherein the first data for the entry of the first security information instance is received over a channel of a streaming protocol used to transmit image data, wherein the image data is generated by the computing resource and is streamed to the client, and wherein a first portion of the image data is received and presented while a second portion of the image data is transmitted;
entering, based at least in part on the first data for the entry of the first security information instance, the first security information instance;
detecting the accessing of the computing resource, the accessing effectuated by the entering of the first security information instance; and
changing the first security information instance to a second security information instance that, when entered into the computing resource and validated, grants access to the computing resource in the second mode.

10. The computer-implemented method of claim 9, wherein the computing resource is hosted by a service, and wherein the client is required to provide other security information for accessing the service prior to the transmitting of the first security information instance to the client.

11. The computer-implemented method of claim 9, wherein the first data for the entry of the first security information instance comprises key data corresponding to characters included in the first security information instance.

12. The computer-implemented method of claim 9, wherein the computing resource is a model computing resource that is deployed to a plurality of other computing resources.

13. The computer-implemented method of claim 9, wherein the first mode is an administrative mode and the second mode is a test mode.

14. The computer-implemented method of claim 9, wherein the first mode is a test and the second mode is an administrative mode.

15. The computer-implemented method of claim 9, wherein the first security information instance is not entered into the client by a user of the client.

16. The computer-implemented method of claim 9, further comprising registering to receive a notification of an event associated with the accessing of the computing resource.

17. One or more non-transitory computer-readable storage media having stored thereon instructions that, upon execution by a computing device, cause the computing device to perform operations comprising:
receiving, from a client, a request associated with switching operation of a computing resource from a first mode to a second mode;
transmitting, to the client, a first security information instance that, when entered into the computing resource and validated, grants access to the computing resource in the second mode;
receiving, from the client, first data for entry of the first security information instance wherein the first data for the entry of the first security information instance is received over a channel of a streaming protocol used to transmit image data, wherein the image data is generated by the computing resource and is streamed to the client, and wherein a first portion of the image data is received and presented while a second portion of the image data is transmitted;
entering, based at least in part on the first data for the entry of the first security information instance, the first security information instance;
detecting the accessing of the computing resource, the accessing effectuated by the entering of the first security information instance; and
changing the first security information instance to a second security information instance that, when entered into the computing resource and validated, grants access to the computing resource in the second mode.

* * * * *